(12) United States Patent
Post et al.

(10) Patent No.: US 7,535,897 B2
(45) Date of Patent: May 19, 2009

(54) PACKETS SWITCHING SYSTEM FOR TELECOMMUNICATIONS NETWORK NODE

(75) Inventors: Georg Post, La Ville du Bois (FR); Ludovic Noirie, Nozay (FR); Silvio Cucchi, Gaggiano (IT); Fabio Valente, Lonigo (IT)

(73) Assignee: Alcatel, Paris (FR)

(*) Notice: Subject to any disclaimer, the term of this patent is extended or adjusted under 35 U.S.C. 154(b) by 404 days.

(21) Appl. No.: 11/561,401

(22) Filed: Nov. 19, 2006

(65) Prior Publication Data
US 2007/0127514 A1 Jun. 7, 2007

(30) Foreign Application Priority Data
Nov. 24, 2005 (FR) .................................. 05 53581

(51) Int. Cl.
*H04L 12/54* (2006.01)
(52) U.S. Cl. ....................... 370/360; 370/412; 370/474
(58) Field of Classification Search ......... 370/360–364, 370/381–383, 386, 412–421, 474, 476
See application file for complete search history.

(56) References Cited
U.S. PATENT DOCUMENTS
7,126,959 B2 * 10/2006 Van Asten et al. ........... 370/429

7,319,669 B1 * 1/2008 Kunz et al. ................. 370/235
2001/0043606 A1 11/2001 Han
2005/0135350 A1 6/2005 Noirie

FOREIGN PATENT DOCUMENTS
EP 1 193 922 A2 4/2002

* cited by examiner

*Primary Examiner*—Wing F Chan
*Assistant Examiner*—Minh-Trang Nguyen
(74) *Attorney, Agent, or Firm*—Patti, Hewitt & Arezina LLC

(57) ABSTRACT

In order to switch selectively via a packets switching matrix waiting in the input modules (IMi) to address output modules, an arbitration function (CSC) selects by successive cycles, from all the pairs of input and output modules, separate subsets. Each cycle comprises p successive phases (x) associated respectively to p arbitration functions. Processing units (PUi) each execute the p functions, each function acting on three parameters termed "residual required quantity", "input capacity" and "output capacity", the values of which are related to a single pair and are set at the start of the cycle. Each phase consists of N successive steps (y) associated respectively to said subsets, each step being executed in parallel by the processing units (PUi) in order to calculate by means of the arbitration functions the "partial" accepted quantity values and to reset the parameters for the next step. Application to telecommunication networks, particularly multiservice.

12 Claims, 3 Drawing Sheets

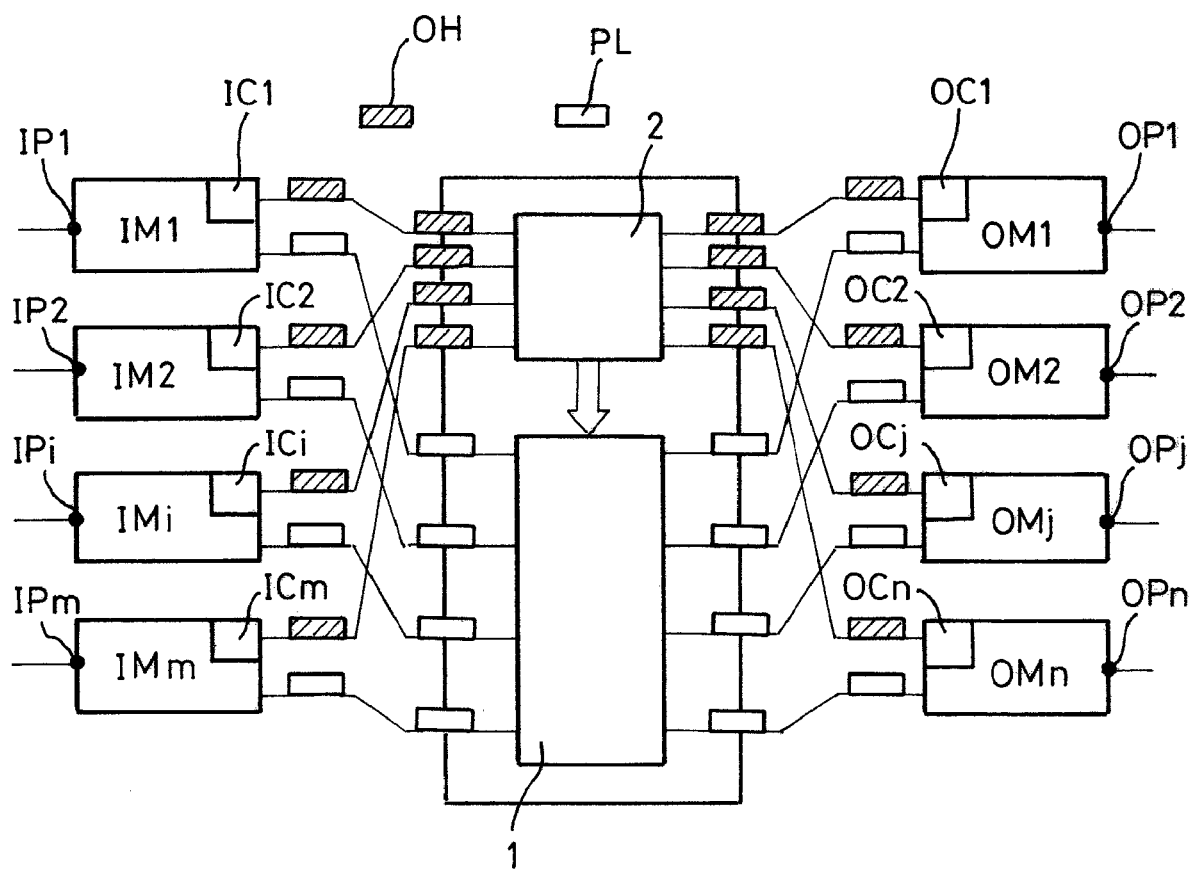

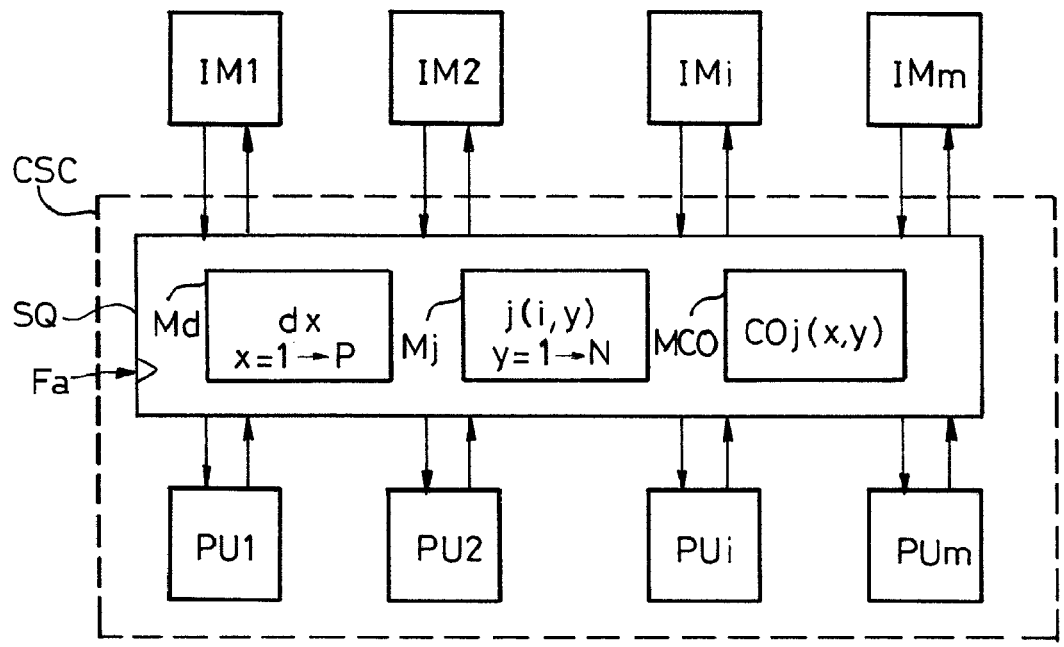

FIG_6
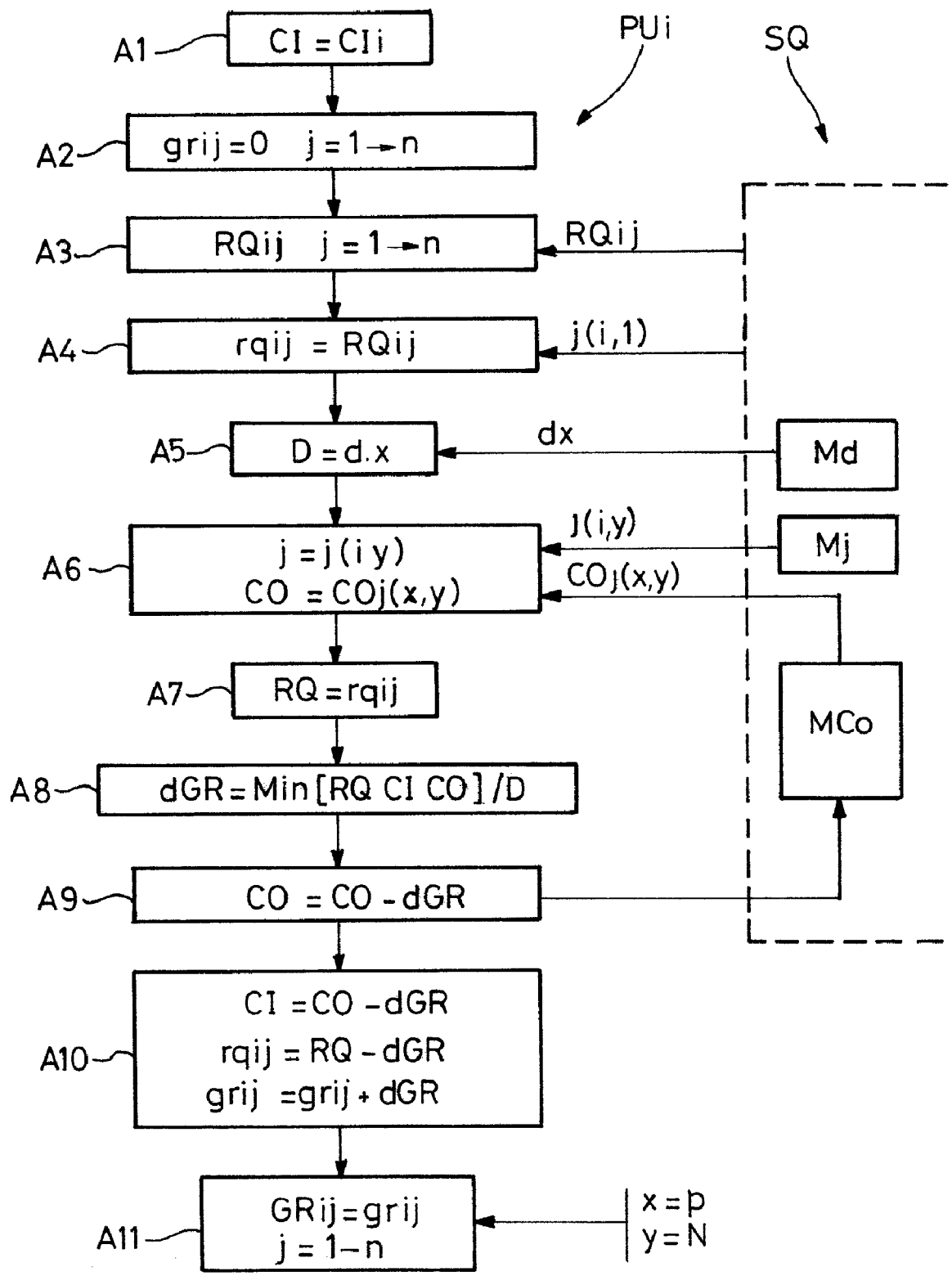

PACKETS SWITCHING SYSTEM FOR TELECOMMUNICATIONS NETWORK NODE

The invention belongs in the telecommunications network domain and relates to switching systems used in network nodes.

The invention relates more particularly to switching systems able to process data organized into packets (packets switching). It relates also to the so-called "multiservice", switching systems, i.e. capable of carrying out packets switching, as well as processing data organized in other transmission formats (circuit switching), typically data organized in time division multiplex ("TDM") such as those conforming to the SDH or SONET protocols, or again ODU ("Optical Data Unit").

The term "packet" here means any set of data which is combined according to a preset format of the information data to be transmitted ("payload") and the auxiliary data contained for example in a header. The header in particular contains an indication of the destination of the packet and generally a quality of service class. The indication can be an explicit destination address or a "label" representing this destination. The most common packet formats include IP (Internet Protocol), MPLS or Ethernet packets, which are of variable size, and ATM cells, which are of fixed size.

It will be recalled that a network includes a plurality of nodes interconnected by transmission links. A node is often connected to several other nodes and thus incorporates routing links to switch selectively the data carried by the signals received from upstream links to other downstream links according to the respective destinations of the data. Some nodes have access functions capable of introducing data into the network or extracting data from the network.

In order to implement a routing function, a node is equipped with a switching system or, more simply, a "switch". A switching system comprises on one hand a number of input ports connected by upstream links to user stations or other nodes and on the other hand a number of output ports connected by downstream links to receivers of other user stations or other nodes. As a rule, the function of the switching system is to switch data flows received by its various input ports, selectively according to their respective destinations, to output ports allocated to these destinations.

An essential role of a switching system is conflict management, i.e. permanent checking of the data switching in order that quantities of received data destined for a single output port are directed to this port at different times. The performance of a system is evaluated by its bandwidth, i.e. the total binary data output which it can switch on average without losing data.

FIG. 1 represents diagrammatically a typical structure of a switching system. This system comprised a switching matrix 1 steered by a central controller 2, a plurality of input modules IM1, IM2, IMi, IMm steered respectively by input controllers IC1, IC2, ICi, ICm and a plurality of output modules OM1, OM2, OMj, OMn steered respectively by output controllers OC1, OC2, OCi, OCn. The input modules are connected respectively to upstream links by input ports IP1, IP2, IPi, IPm, and the output modules are connected respectively to downstream links by output ports OP1, OP2, OPj, OPn. Each input port IPi or output port OPj can "aggregate" a plurality of physical or logical packet transmission channels. The input and output modules also co-operate with the central controller 2, which combines the central system control functions. The numbers m and n of the input and output modules are often equal, but could be different, according to the type and part of the network in question.

The data for switching received by the input ports IPi are transmitted to the matrix by the input modules IMi, and according to the orders received from the central controller 2, the matrix carries out a selective switching of this data to the output ports OPj by means of the output modules OMj. Each input module IMi or output module OMj also communicates with the controller 2 in order to exchange control signals and data relevant to the correct running of the selective switching.

More precisely, each input module IMi has a physical interface role with the associated upstream link and includes means of storing and processing the received data, these means being designed to store this data temporarily, for example in the case of packets while forming and managing packet queues. If several classes of quality of service (or more simply "classes of service") are provided in the network, a number of queues will be provided and allocated respectively to these classes.

Typically, each input module is planned to constitute a number of queues organized both by destination output port and by quality of service class. Thus, each of these queues contains waiting packets destined for a given output port and enjoying a given quality of service class. If output modules are each provided to manage a number of output channels sharing the same output port, a queue will also be provided for each output port output channel, for each quality of service class. The queues thus organized are sometimes known as "Virtual Output Queues" or VOQ.

Managing queues consists first of populating these queues continuously with the new data received, and second of extracting from these queues the data authorized to be transferred to the matrix.

Data transfers between the input modules IMi and the switching matrix 1 first, and transfers between the matrix and the output modules OMj second will normally be carried out by successive switching cycles of constant duration T, referred to hereafter as "transfer duration". The switch should also be designed so that, with each switching cycle, each input and output module can respectively send and receive a number of packets simultaneously. An input module will be, for example, planned to constitute and send with each cycle a data block incorporating a set of packets, each block, of a fixed size, incorporating a number of groups of packets associated respectively to different output modules, each group comprising packets intended for a single output module associated to this group. The size of a group should be editable. If necessary, it will also be sub-divided into sub-groups associated respectively to a number of channels and/or a number of classes of service. A switch of this type is described in more detail in European patent application EP 1549103, published on 29 Jun. 2005, corresponding to the American application published as US 2005/0135350.

In order that the matrix can implement the switching of the data thus transferred, the central controller must in particular know to which respective output ports this transferred data must be switched by the matrix. This switching data is obtained from the destinations contained in the packet headers and according to the routing data loaded beforehand in a routing table. The input modules are loaded for preparing this switching data and transmitting it to the central controller, as well as to the associated packets transferred to the matrix. The controller then takes into account the switching data associated to the packets in order to be able then to switch it.

This control data is usually referred to as an "overhead", and is added to the "relevant" information data for switching. This aspect is represented on FIG. 1, where the relevant load and the overhead are symbolized by the blank rectangles PL and the hatched rectangles OH respectively.

Before the actual switching operations mentioned above, a fundamental function of a packets switching system is the mechanism which lets you select at any time during operation how much data and from which queues is allowed to be transferred. Conventionally, this role is given to the so-called "arbitration" means ("scheduler" or "arbiter") provided to implement the selections according to predefined rules.

In order to identify the data to be selected, the means of arbitration run an arbitration process designed to optimize the data transfer according to chosen criteria. Among other possible criteria, these conditions at least must be met:

avoid conflicts, as already stated;

authorize input modules to transfer by cycle quantities of data compatible with the maximum transfer capacity between each input module and the matrix on one hand and between the matrix and each output module on the other.

Moreover, a good arbitration mechanism must generally meet the following supplementary conditions:

make choices of queuing packets with a degree of "equity", i.e. process all packets with a single class of service equally in terms of mean transfer time evaluated over a time horizon that is as short as possible, regardless of the input and/or output ports via which they transit, for example by taking into account the order in which the packets for switching arrive;

give packets to be extracted queues with different priorities, according to their respective classes of service;

contribute to optimizing the use of the switch resources, i.e. maximize its bandwidth.

In summary, the arbitration mechanism implements an arbitration function executable by successive arbitration cycles, in order to determine for each cycle and for each queue, and according to requests sent by all the input modules, quantities of data accepted for a transfer, within a single switching cycle having the fixed transfer period T, from the input module managing this queue to the matrix.

If several queues are provided in each input module, for example a queue per class of service and/or per channel, several levels of granularity can be distinguished concerning quantities of data. This produces a number of definitions relevant to the understanding of the context of the invention.

We define an "itemized" quantity of packets relative to an input module as a quantity of data constituting a set of packets received by this input module, having a given level of priority and allocated to a single output channel of a given output module. This quantity can be, for example, a number of bytes or binary words or cells or packets if the latter are of a fixed size.

A "request" will be representative of such an itemized quantity of packets waiting until an input module is ready to transfer and which will be designated by the "required" itemized quantity of packets.

A so-called "aggregated" quantity of packets is generally defined as the sum of several quantities itemized relative to a given pair of input and output modules IMi-OMj, for all priority levels and for all output channels managed by the output module OMj of the pair.

A "required" aggregated quantity of packets for an input module IMi and relative to a pair formed from this input module and a given output module OMj is defined as an aggregated quantity of packets queuing until this input module is ready to transfer.

An "accepted itemized" quantity of packets relative to a given input module IMi is defined as an itemized quantity of packets which the input controller ICi of this input module is authorized to transfer during a single transfer period T of a single switching cycle.

An "accepted aggregated" quantity of packets for an input module IMi and relative to a pair formed by this input module and a given output module OMj is defined as an aggregated quantity of packets which the input controller ICi of this input module is authorized to transfer during a single transfer period T of a single switching cycle, in contention with other accepted aggregated quantities relative to other pairs formed from this input module and other output modules.

Regardless of the number and organization of the queues in the input modules, we can distinguish in the general arbitration mechanism a particular arbitration function, termed "central arbitration function", having as its specific role to determine for each cycle, according to the requests, the "accepted aggregated" quantities which are therefore quantities of packets, at most equal to the required aggregated quantities, limited to the maximum quantities of data that can be transferred during the fixed transfer period T between each input module and the matrix on one hand, and between the matrix and each output module on the other hand.

These maximum quantities relative respectively to each input module and to each output module are called respectively "maximum input capacity" and "maximum output capacity".

The general arbitration mechanism will thus consist of this central arbitration function and "itemized" arbitration function more specially loaded to take into account supplementary restrictions relating to classes of service and to different output channel ports.

Of course, in a system providing only a single queue per input module, the general arbitration mechanism would be the same as the central arbitration function.

The invention relates specifically to such a central arbitration function and its use in a switching system. Hereafter, only this part will therefore be developed. Also, as only the aggregated quantities of packets defined above are involved, the term "aggregated" will henceforth be omitted and deemed implicit.

One aim of the invention is to propose a switching system in which the central arbitration function is designed both to:

comply with the maximum transfer capacities between the matrix and the input and output modules, allow a good equity regarding packets, regardless of the input and output modules by which they transit, authorize a relatively simple implementation, even for high capacity switches, and in particular for multiservice switching systems which impose rigorous restrictions on processing times.

For example, a switching system to be installed currently in optical fibre infrastructure networks ("backbone" in English) must typically comply with the following specification:

process both packet and "TDM" circuit switched traffic;

handle several hundred channels per output port;

handle some thousands of queues in each input module.

The central arbitration function can be formulated mathematically as the resolution of a matrix problem with restrictions. Indeed, all the requests relating to all the input and output module pairs IMi, OMj can be represented as a requests matrix having m lines and n columns, where each element at the of a line i and of a column j is a required quantity $RQ_{ij}$ of packets which are candidates for a transfer from the input module IMi to the output module OMj. FIG. 2 represents such a matrix $[RQ_{ij}]$ in the particular case where m=n=4.

The arbitration function thus consists of calculating the elements of a matrix [GRij] (not shown) the same size, where each element at the intersection of a line i and of a column j is an accepted quantity GRij relative to the corresponding pair of input and output modules IMi, OMj, the accepted quantities having to satisfy the conditions mentioned previously.

For this type of calculation, conventional methods can be used, such as the Birkhoff method. Its implementation then consists of using conventional processing means, for example based on a microprocessor, programmed to run a corresponding algorithm.

Because calculating the accepted quantities includes all the required quantities for each cycle, this solution can obtain a rigorous result in terms of equity. However, for high capacity switches, this needs a long run time and/or forces recourse to special high speed processing means which are therefore costly.

In order to produce high capacity switches, the implementation of the arbitration function should be simpler. To achieve this, the invention proposes a particular architecture capable of operating both sequentially and in parallel, but which still remains suitable in terms of equity.

More precisely, the object of the invention is a switching system for a telecommunication network node, comprising m input modules and n output modules, each co-operating with a switching matrix and with a central controller controlling said matrix, said system being capable of switching selectively, via the matrix, data packets received via said input modules, according to their respective destinations, to the respective destination output modules, a quantity of packets relating to a given pair of input and output modules being defined as a quantity of data constituting packets received by this input module and intended for the output module of this pair, a request relating to a given pair of input and output modules being representative of a quantity termed "required" defined as a quantity of packets queuing in this input module and candidates to be transferred to this output module, said central controller incorporating a central arbitration unit in order to implement an arbitration function executable by successive arbitration cycles, each cycle determining, according to said requests relating to all input and output modules, the respective quantities termed "accepted" defined as quantities of packets, at most equal to said required quantities respectively, restricted to the maximum quantities of data capable of being transferred during a fixed transfer period between each input module and the matrix on one hand, and between the matrix and each output module on the other, these maximum quantities being called "maximum input capacity" and "maximum output capacity" respectively, characterized in that all the input and output pairs capable of being divided into N separate subsets such that neither an input module nor an output module belongs to more than one pair of a single subset, the central arbitration unit is capable of activating for each arbitration cycle p successive phases associated to p functions respectively, and incorporates a plurality of processing units each capable of running said p functions, each function applying to at least three parameters called "residual required quantity", "input capacity" and "output capacity" in which the values are relative to a single pair and are set respectively at the start of the cycle by a required quantity corresponding to a request, and said maximum input and output capacities relative to this pair, in that each phase consists of N successive steps associated respectively to said subsets, each step being run in parallel by said processing units in order to implement for each pair of the associated subset the following operation:

calculation of so-called "partial" accepted quantity value (dGR) by applying to the values of said parameters the function associated to the phase which includes this step, calculation of revised values of said parameters by subtracting this partial accepted quantity value from each of the values which said parameters had at the start of the step, said revised values providing parameter values for the next step, the sum of the partial accepted quantity values relative to a single pair and calculated during a complete cycle constituting the accepted quantity relating to this pair, and in that said p functions are such that for the given positive values of said three parameters, the resultant partial accepted quantity value for a given phase is > the resultant value obtained for a preceding phase.

The act of organizing the arbitration process in successive phases and steps, the steps being relative to subsets of pairs of input and output modules as defined above, authorizes the execution of each step by several means of processing running in parallel, independently of each other, which reduces the processing time compared with the conventional solution.

Moreover, as the architecture is modular, it has the advantage of being easily upgradeable, i.e. to allow without too many problems the adaptation of the elements of the system to changes to the number of input and output ports, without increasing processing time. This is particularly useful for producing the multiservice switching systems mentioned previously. Indeed, processing via a single data matrix of the TDM type imposes on the system an operation synchronized to an imposed rhythm, which constitutes for the arbitration function a supplementary restriction compared with simple packets switching systems.

To provide a satisfactory equity regardless of the types of traffic to be supported, said subsets should be defined for a given cycle to be different from those defined for the cycle which follows. This disposition will let each input and output module be processed in the same way, at least on average over several cycles.

Second, according to usage contexts, functions can be imagined in different ways, provided in fact that, at the end of each cycle, the calculated accepted quantities ensure compliance with the maximum input and output capacities.

According to one particular embodiment complying with this condition, each function consists of dividing the smallest of said values of said parameters of the required quantity, input capacity and output capacity respectively by a divisor having a value associated to this function, said divisors associated respectively to p successive phases being decremented from an initial value until reaching a final value equal to 1.

Thus, each function is easy to produce as its implementation fundamentally needs comparators and a divider circuit. Moreover, the act of taking a final value equal to 1 guarantees that no transfer capacity will be unused.

Each factor should have a value equal to a 0power of 2. Then the divider circuit can consist of a single shift register.

However, there are various options for defining subsets of input and output module pairs. Nonetheless, the choice of subsets should allow the choice of subsets to divide the arbitration function among the processing units as uniformly as possible.

Preferably, therefore, the choice of subsets of input and output module pairs will each consist of a single number M of input and output module pairs. The central arbitration unit could therefore also comprise M processing units cooperating with a common sequencer intended to synchronize and/or coordinate the respective processing unit operations.

Other aspects and advantages of the invention will become apparent in the description which follows with reference to the figures.

FIG. 1, as noted previously, represents diagrammatically an example of a switching system where the invention can be used.

FIG. 2, as noted previously, is a matrix representation of the requests.

FIG. 3 shows diagrammatically a central arbitration unit according to the invention.

FIG. 4 represents a first index matrix representative of an arbitration cycle phase according to a first method of implementing the invention.

FIG. 5 represents a second index matrix representative of an arbitration cycle phase according to a second method of implementing the invention.

FIG. 6 is a flow diagram to explain the operation of an arbitration unit according to the invention.

FIG. 3 represents diagrammatically an example of implementation of the central arbitration unit CSC, connected with the input modules IM1, IM2, IMi, IMm.

The arbitration unit CSC fundamentally includes a sequencer SQ cooperating with processing units PU1, PU2, PUi, PUm. According to the example represented, the number of processing units and the number of input modules is the same, but this is not the only possibility, as will be explained later.

The sequencer SQ is designed to activate successive arbitration cycles to a given rhythm. This rhythm is in theory a constant frequency Fa, but it could if need be follow other rules.

For each arbitration cycle, the sequencer SQ activates p successive phases associated respectively to p functions. These p functions are, for example, defined by different values dx of a divisor, where "x" is an integer between 1 and p inclusive, where each value is an indicator of a corresponding phase of a given cycle.

According to the example represented, the sequencer also incorporates means to activate during each phase N successive steps, each identified by an integer "y" between 1 and N inclusive.

At each step, the sequencer extracts from a memory Mj (or prepares) indices j identifying the output modules to be associated to the input modules of indices i so that the different processing units carry out the stipulated operations applying to the requests relating to the input and output pairs IMi-OMj identified by these indices. On the figure, this function is marked j (i,y), for "y" between 1 and N inclusive.

The sequencer also includes a memory MCO, updated at each step, and storing values of output capacity relating to the different output modules. COj(x,y), the output capacity value of the output module OMj to be taken into account at the start of the step y of the phase x, is marked. At the start of a cycle, i.e. at the start of the first step of the first phase of the cycle, the output capacity of each output module will have its maximum output capacity as the value. Subsequently, at the end of each step involving this output module, this capacity is updated to take a value corresponding to a "residual" output capacity.

The processing units PUi each incorporate circuits capable of implementing p functions corresponding to p successive phases of each arbitration execution cycle.

Each function supports at least three parameters relating to a single pair of input and output modules: a "required quantity" RQ, an "input capacity" CI and an "output capacity" CO, whose respective values are set at the start of each cycle activated by the sequencer. At each step, the function is applied to these parameters to supply a partial accepted quantity value. The values of the parameters are then reset for the next step by subtracting this partial accepted quantity value from each of the values that the three parameters had at the start of the step.

The sum grij of all the partial accepted quantity values relative to a single pair and calculated during a single complete cycle thus constitutes the accepted quantity GRij relating to this pair, The value of this accepted quantity GRij relative to each pair is then transmitted to each input module of the relevant pair.

In one particular embodiment, the sequencer SQ controls the processing units so as to indicate to them at each phase the function to be executed and at each step the relevant pair of input and output modules, and the input and output capacity values to be included by this step.

More detailed explanations concerning sequential operation in this particular case will be given later by reference to FIG. 6.

Before this, it will be useful to explain various possibilities for implementing the invention. To do this, it is convenient to reiterate the matrix representation introduced by FIG. 2. According to this representation, the pairs of indices of ij of each element RQij of the matrix [RQij] identify the various input and output module pairs IMi-OMj.

In the example shown, the number m of input modules is equal to the number n of output modules. We have taken m=n=4, well aware that, in reality, the number of input or output modules will certainly be much greater, for example equal to 32 or more. Obviously, the case where m<n is represented by a rectangular matrix having more columns than lines, for example 4 columns and 3 lines. Conversely, the case where m>n is represented by a rectangular matrix having more lines than columns, for example 4 lines and 3 columns.

One characteristic of the invention consists of stipulating a division (or partition) of all the input and output module pairs IMi-OMj into N separate subsets such that neither an input module nor an output module belongs to more than one pair of a single subset. This means that the representative matrix is divided into N diagonals or parts of diagonals, to a permutation close to the lines and columns allocated respectively to the input and output modules.

Concerning the choice of numbers of input and output module pairs constituting the subsets and hence the corresponding numbers of elements diagonals or parts of diagonals, it is appropriate to make the following observations.

First of all, the number of elements of a diagonal is at most $\geq$ the two numbers m and n. Next, in order to have a satisfactory use of the means of processing, it is preferable that the arbitration function should be divided uniformly in time and among the processing units. For this, it will be appropriate for each subset of input and output module pairs to consist of a single fixed number of pairs M. This means that the matrix will be divided into diagonals or parts of diagonals incorporating a single number of elements M. The result of this is that the number of diagonals or parts of diagonals and thus the steps of each phase is given by: N=m.n/M.

This case is adapted to an implementation where the central arbitration unit comprises M processing units, each of these units executing N steps per phase.

A preferred case is that where each subset corresponds to a complete diagonal, which corresponds to a maximum parallelism.

In this case, in order to limit data exchanges between the units and the sequencer, each processing unit should also be permanently associated either to a single input module IMi, or to a single output module OMj. In other words, each processing unit PUi should be reserved for processing:

either the quantities required by a single input module IMi associated and intended for n output modules, or the quantities required by the m input modules and intended for a single associated output module (OMj).

If m and n are not equal, N should be chosen to be $\geq$ both the numbers m and n, and M should be at least equal to the smaller of the two numbers m and n, each processing unit PUi being dedicated to the processing of the required quantities, which involve either an associated input module IMi, or an associated output module OMj, depending on whether m is < or > n respectively.

This implementation has the property of procuring a maximum parallelism with a minimum number of processing units.

A first example according to these rules is illustrated in FIG. 4 by means of an index matrix [ij] relating to one phase. Each column of the matrix includes the sequence, step by step, of the indices ij of the requests, according to which the matrix [RQij] of FIG. 2 and which are processed by a single processing unit PUi associated to a single input module IMi. Each line thus represents the indices ij of requests processed in parallel by the processing units PU1-PU4 during a single step. Therefore, successive lines forming the index matrix [ij] designate the corresponding request indices from the matrix [RQij], which are processed during the successive steps y=1 to 4 of each phase of a single cycle.

If m is < n, the index matrix will have only m columns and n lines, as shown in FIG. 4, where the missing indices are shown in brackets, in a case given as an example, where n=4 and m=3. In general, there would therefore be m processing units and n steps per phase.

A second example is illustrated in FIG. 5 by means of another index matrix [ij] where each column includes the indices ij of requests processed by a single processing unit associated to a single output module OMj.

As in the previous case, if m were > n, the index matrix will have only n columns and m lines, as shown in FIG. 5, where the missing indices are shown in brackets, in the case given as an example, where n=3 and m=4. In general, there would therefore be n processing units and m steps per phase.

The choice of subsets of input and output module pairs could, however, follow other criteria by considering the following remark.

The accepted quantities GRij calculated by the processing units are normally intended for the input modules Imi, which were the source of the corresponding requests RQij.

Again in order to simplify the interconnections involving the processing units, if the requests RQij are created by the input modules, it can be beneficial in any case that each processing unit PUi should be reserved for processing the required quantities output by a single associated input module IMi. Of course, as each processing unit PUi is still associated to a single input module IMi, according to the diagram in FIG. 4, for example, the transmission of requests from each input module to the associated processing unit and the transmission in return of the accepted quantities can be done directly, without needing an editable switching interface.

It may be noted that, if m>n, the system will function as if there were m input modules and m output modules, the difference being that the virtual steps relating to m−n non-existent output modules would be run, so as to maintain the synchronization of the processing units.

FIG. 6 will be used to explain the sequential operation of the arbitration unit.

This operation involves the sequencer SQ and all the processing units PUi according to a diagram which will be described for a particular case where each processing unit is associated to a corresponding input module. FIG. 6 shows more precisely how the processing unit Pui, reserved for processing the required quantities RQij relating to the single associated input module Imi, cooperates with the sequencer SQ.

Furthermore, the special arbitration functions have been chosen as an example.

FIG. 6 groups in the form of a flow diagram the principal operations A1 to A11 carried out sequentially during the successive steps and phases by I' processing units PUi associated to the input module IMi, and the data exchanges made with the sequencer SQ.

In order to facilitate explanations, we should first of all recall or define the notations used:

CIi: maximum input capacity of the input module IMi;

CI: "input capacity" parameter, the value of which included at the start of each step is revised at the end of each step;

COj: maximum output capacity of the output module OMj;

RQij: required quantity corresponding to a request sent by the input module IMi for a transfer of packets to the output module OMj;

GRij: accepted quantity in response to the required quantity RQij, rqij: value of the residual required quantity relative to the pair IMi-OMj revised at the end of each step;

RQ: "residual required quantity" taking at the start of each step the value of the residual required quantity rqij revised in the previous step;

p: number of arbitration phases per cycle;

x: indicator (order number) of an arbitration phase;

D: divisor relating to the arbitration function for the phase undergoing execution;

dx: values of the divisor for the various x phases;

N: number of steps per arbitration phase;

y: indicator (order number) of a step in an arbitration phase;

CO: "output capacity" parameter, the value of which included at the start of each step is revised at the end of each step;

COj(x,y): output capacity value for a given output module OMj to take into account as the value of the parameter CO at the start of the step y of the phase x, the value of CO revised at the end of the step supplying the value of the output capacity of the same output module for the next step y+1 of the same phase x;

dGR: partial accepted quantity calculated per step;

grij: cumulation of the partial accepted quantity values relating to the IMi-OMj pair and calculated from the start of a cycle;

As represented diagrammatically on the diagram, an arbitration cycle starts with the setting operations, which are repeated for each cycle:

in A1, the maximum input capacity value CIi of the associated input module IMi is allocated to the input capacity CI, in A2, the grij cumulations of the partial accepted quantity values relating respectively to n IMi-OMj pairs formed by the input module IMi and n output modules OMj are set to 0.

in A3 are loaded the required quantities RQij corresponding to the requests relating to transfers of packets from the input module IMi to the n output modules OMj respectively.

If the requests are prepared by the input modules, the corresponding required quantities RQij can be transferred directly between each input module IMi and the associated processing unit PUi by a single link, without any switching action by the sequencer SQ. This would not be the case if the requests were prepared by the output modules.

The arbitration cycle is continued by the specific setting operations for the cycle. To do this, via suitable means Mj (preloaded memory or programmed module), the sequencer can identify for each cycle the continuation of the input and output pairs IMi-OMj for which the corresponding requests must be included by the successive steps of each phase of this cycle.

As in our example each processing unit, such as PUi, processes only the required quantities RQij relating to the single associated input module, such as IMi, the continuation of the pairs will be entirely identified for each processing unit PUi by a continuation of the values of the single index j of the output modules OMj, this continuation being specific for each input module IMi and thus marked j (i,y), for "y" between 1 and N inclusive. Accordingly, for each step y, the unit receives the identifier j (i,y) of the relevant output module OMj for the step to be executed.

Moreover, the sequencer can for each cycle identify via the adapted means Md (preloaded memory for example), the continuation of p functions associated respectively to p successive phases of the cycle. According to the example described here, the p functions are identified simply by different values dx of a divisor D, where "x" is an integer between 1 and p inclusive identifying a corresponding phase of the cycle.

The sequencer also includes a memory MCO, updated at each step, and storing values of output capacity relating to the different output modules OMj. The output capacity CO to be taken into account at the start of the step y of the phase x for a given output module OMj is marked COj(x,y). Accordingly, at the start of the cycle, its output capacity CO will have the value COj(1,1), which coincides with its maximum output capacity COj.

The arbitration cycle thus continues with the following setting operations:

in A4, setting of the residual required quantity value rqij with the required quantity value RQij relating to the output module OMj corresponding to the first index j, j(i,1), of the continuation j(i,y). The required quantity RQij is therefore the residual required quantity value rqij which will be included for the first step of the first phase of the cycle;

in A5, setting of the divisor D with the value of dx for the first phase, i.e. d1;

in A6, setting of the index j with the value j(i,y) corresponding to the first step (y=1), i.e. with the index j(i,1), and setting of the "output capacity" parameter CO with the output capacity value COj(x,y) corresponding to this same index j(i,1) and thus corresponding to the first step (y=1) of the first phase (x=1) of the cycle, i.e. with the maximum output capacity COj of the output module OMj corresponding to the index j(i,1);

in A7, setting of the "residual required quantity" RQ with the value rqij of the residual required capacity set in A4, i.e. with the required quantity value RQij.

The first step is executed then by the operations A8 to A10:

in A8, calculation of a first partial accepted quantity value dGR by applying to the values of the parameters RQ, CI, CO the function associated to the first phase, i.e. the function dGR=Min [RQ, CI, CO]/D.

in A9, calculation of a revised value of the "output capacity" parameter CO by replacing the partial accepted quantity value dGR calculated in A8 by the value which this parameter CO had at the start of the step, and sending this revised value to the sequencer SQ in order to update in the memory MCO the output capacity value relating to the relevant output module OMj for this step, and which must be included for the same output module at the next step y+1 of the same phase x.

in A10, calculation of the revised values of the parameters CI and rqij by replacing the partial accepted quantity value dGR calculated in A8 for each of the values which these parameters had at the start of the step, and calculation of a revised value of the cumulation grij by adding the partial accepted quantity value dGR to the value which this cumulation had at the start of the step.

The revised value of CI becomes the input capacity value CI to be included for the next step. The revised values of rqij and grij become the values of these parameters to be included in the same cycle at the next step which involves the same pair of indices ij.

The operations A6 to A10 are repeated during the following steps by using successive values of the index j(i,x) and of the output capacity COj(x,y) supplied by the sequencer at the start of each new step.

After executing N steps, the process for the next phase recommences from the operation A5 by allocating to the divisor D the next dx value (i.e. d2 for the second phase) supplied by the sequencer.

The same operations are repeated until the next step (for y=N) of the final phase (for x=p) of the cycle. The cycle is then ended and the processing unit PUi places in A11 for each index j the accepted quantity GRij which is equal to the value taken at this stage by the cumulation grij of the partial accepted quantity values calculated during the cycle for this same index j.

A subsequent cycle is then executed according to the same algorithm. To provide a satisfactory equity among the input and/or output modules regardless of the types of traffic to be supported, said subsets should be defined for a given cycle to be different from those defined for the cycle which follows. Of course, the requests considered first by successive cycles should concern different input and/or output modules, chosen such that each input and output module are processed similarly, at least averaged over several cycles.

The preceding description applies to the particular case where each processing unit PUi is dedicated to the processing the quantities required by a single associated input module IMi.

For practical implementation, it suffices to make the following arrangements:

each processing unit has and manages local registers storing a phase indicator and values of the maximum input capacity for this input module, as well as the required quantities and accepted quantities relating to the n pairs formed by the associated input module and the n output modules, said sequencer (SQ) supplies to each processing unit, at the start of each step, a pair of values formed by an identifier of an output module and of its output capacity, each processing unit is provided to transmit to the sequencer, during each step, the revised value of the output capacity, and to determine the sum of the partial accepted quantity values relating to each pair formed by the associated input module and each output module.

Another particular case, not described in detail is that where each processing unit is dedicated to processing the required quantities intended for a single associated output module. The following provisions will then be stipulated:

each processing unit has and manages local registers storing a phase indicator and values of the maximum output capacity for this output module, as well as the required quantities and accepted quantities relating to the m pairs formed by the associated output module and the m input modules, the sequencer (SQ) supplies to each processing unit, at the start of each step, a pair of values formed by an identifier for an input module and for its input capacity, each processing unit is provided to transmit to the sequencer, during each step, the revised value of the input capacity, and to determine the sum of the partial accepted quantity values relating to each pair formed by the associated output module and each input module.

In the two preceding cases, the sequencer SQ has not only a synchronization role in order to activate the cycle starts, but also distribution of the data needed for the execution of each step of each cycle, as well as centralized storage of the input or output capacities updated at each step.

There is also another implementation possibility, according to which the sequencer SQ no longer acts at each step, but only at the start of each cycle.

According to this implementation, the processing units are interconnected according to a ring network allowing data exchanges in a predefined direction between each unit and an adjoining unit situated downstream. Each unit is then provided:

to transmit during each step to the adjoining unit situated downstream a pair of values formed by an identifier of an output module and of its revised output capacity, to receive during each step from the adjoining unit situated upstream a pair of values formed by an identifier of an output module and of its output capacity, revised during the preceding step.

According to one derived variant of the preceding implementation, by exchanging the input and output roles, the processing units are also interconnected according to a ting network allowing data exchanges in a predefined direction between each unit and an adjoining unit situate downstream. Each unit is provided:

to transmit during each step to the adjoining unit situated downstream a pair of values formed by an identifier of an input module and of its revised input capacity, to receive during each step from the adjoining unit situated upstream a pair of values formed by an identifier of an input module and of its input capacity, revised during the preceding step.

These last two variants have the advantage, for a given technology, of reducing to the maximum the time for executing the arbitration function. Against this, they offer less flexibility regarding the choice of subsets of pairs of input and output modules adopted for successive cycles.

As shown for example on FIG. 6 in A8, the function consists of dividing the smallest of the values of the parameters RQ, CI, CO by a divisor D having a value associated to this function:

$$dGR = \text{Min } [RQ, CI, CO]/D, \text{ where } D = dx \text{ for the phase } x.$$

The values $d_1$–$d_p$ of the divisor associated respectively to p successive phases are decreasing from an initial value < 1 up to a final value of $d_p$ equal to 1.

The values $d_1$–$d_p$ of the divisor can be chosen in various ways. For example, simulation can search for values optimized for the type of traffic for which the switching system is intended.

In practice, excluding very specific cases, the choice of suitable $d_1$–$d_p$ values can result from the following considerations.

First of all, it is interesting that each value of the factor should be a power of 2, as divisions by these factors convert into binary representation by simple shifts of binary numbers, which involves an implementation by means of a shift register which is much simpler and faster than a true divider.

Second, the order of magnitude of the initial value $d_1$ of the factor can be determined theoretically by taking the following reasoning. If we take the case where m=n and where the traffic is uniform referred to the input and output ports, and such that quantity required by each input module is > its maximum input capacity CIi, if the maximum input capacities all have a single value, the accepted quantities should all have a single value and therefore equal the maximum input capacity divided by m, i.e. CIi/m.

Given the formula used, the first partial accepted quantity obtained is $dGR = CIi/d_1$. Accordingly, the initial value of the divisor should be ≧ the number m of input modules.

The invention is not limited alone to the methods of implementation described above.

The invention claimed is:

1. Switching system for a telecommunication network node, comprising m input modules (IM1, IM2, IMi, IMm) and n output modules (OM1, OM2, OMj, OMn), each co-operating with a switching matrix and with a central controller (2) controlling said matrix (1), said system being capable of switching selectively, via the matrix (1), data packets received via said input modules, according to their respective destinations, to the respective destination output modules, a quantity of packets relating to a given pair of input and output modules (IMi, OMj) being defined as a quantity of data constituting the packet(s) received by this input module and intended for the output module of this pair, a request relating to a given pair of input and output modules being representative of a quantity termed "required" (RQij) defined as a quantity of packets queuing in this input module and candidates to be transferred to this output module, said central controller (2) incorporating a central arbitration unit (CSC) in order to implement an arbitration function executable by successive arbitration cycles, each cycle determining, according to said requests (RQij) relating to all input and output modules, the respective quantities termed "accepted" (GRij) defined as quantities of packets, at most equal to said required quantities respectively, restricted to the maximum quantities of data capable of being transferred during a fixed transfer period between each input module (IMi) and the matrix (1) on one hand, and between the matrix (1) and each output module (OMj) on the other, these maximum quantities being called "maximum input capacity" (CIi) and "maximum output capacity" (COj) respectively, characterized in that all the input and output pairs (IMi, OMj) capable of being divided into N separate subsets such that neither an input module nor an output module belongs to more than one pair of a single subset, the central arbitration unit (CSC) is capable of activating for each arbitration cycle p successive phases (x) associated to p functions respectively, and incorporates a plurality of processing units (PUi) each capable of running said p functions, each function applying to at least three parameters called "residual required quantity" (RQ), "input capacity" (CI) and "output capacity" (CO) in which the values are relative to a single pair and are set respectively at the start of the cycle by a required quantity (Rqij) corresponding to a request, and said maximum input and output capacities (CIi, COj) relative to this pair, in that each phase consists of N successive steps (y) associated respectively to said subsets, each step being run in parallel by said processing units (PUi) in order to implement for each pair of the associated subset the following operation:

calculation of a so-called "partial" accepted quantity value (dGR) by applying to the values of said parameters the function associated to the phase (x) which includes this step, calculation of revised values of said parameters by subtracting this partial accepted quantity value (dGR) from each of the values which said parameters had at the start of the step, said revised values providing parameter values for the next step, the sum (grij) of the partial accepted quantity values relative to a single pair and calculated during a complete cycle constituting the accepted quantity (Grij) relating to this pair, and in that said p functions are such that for the given positive values of said three parameters, the resultant partial accepted quantity value for a given phase is > the resultant value obtained for a preceding phase.

2. Switching system in accordance with claim 1, characterized in that said subsets defined for a given cycle are different from those defined for the cycle which follows.

3. Switching system in accordance with claim 1, characterized in that each function consists of dividing the smallest of said values of said parameters (RQ, CI, CO) of the required quantity, input capacity and output capacity respectively by a divisor (dx) having a value associated to this function, said values of the divisor (d1–dp) associated respectively to p successive phases being decremented from an initial value until reaching a final value (dp) equal to 1.

4. Switching system in accordance with claim 3, characterized in that each value (d1–dp) of said divisor (dx) is a power of 2.

5. Switching system in accordance with claim 3, characterized in the said initial value of the divisor is ≧ the number m of input modules.

6. Switching system in accordance with claim 1, characterized in that said subsets each consist of a single number M of pairs of input and output modules (IMi, OMj) and in that the central arbitration unit (CSC) comprises M processing units (PUi) cooperating with a common sequencer (SQ).

7. Switching system in accordance with claim 6, characterized in that each processing unit (PUi) is dedicated to processing:

either the quantities required by a single input module (Imi) associated and intended for said n output modules, or the quantities required by said m input modules and intended for a single associated output module (OMj).

8. Switching system in accordance with claim 7, characterized in that if m and n are not equal, N is equal to the greater of the two numbers m and n, and M is equal to the smaller of the two numbers m and n, each processing unit (PUi) being dedicated to the processing of the required quantities, which involve either an associated input module (Imi), or an associated output module (OMj), depending on whether m is < or > n respectively.

9. Switching system in accordance with claim 7, characterized in that if each processing unit (PUi) is dedicated to processing the required quantities via a single associated input module (IMi):

each processing unit (PUi) has and manages local registers storing a phase indicator (x) and values of said maximum input capacity (CIi) for this input module (IMi), as well as the required quantities (RQij) and accepted quantities (GRij) relating to the n pairs formed by the associated input module (IMi) and the n output modules (OMj), said sequencer (SQ) supplies to each processing unit (PUi), at the start of each step (y), a pair of values formed by an identifier (j(i,y)) of an output module (OMj) and of its output capacity (COj(x,y)), each processing unit (PUi) is provided to transmit to the sequencer (SQ), during each step, the revised value of the output capacity (COj), and to determine the sum of the partial accepted quantity values (grij) relating to each pair formed by the associated input module (IMi) and each output module (OMj).

10. Switching system in accordance with claim 7, characterized in that if each processing unit (PUi) is dedicated to processing the required quantities intended for a single associated output module (OMj):

each processing unit (PUi) has and manages local registers storing a phase indicator (x) and values of said maximum output capacity (COj) for this output module, as well as the required quantities (RQij) and accepted quantities (GRij) relating to the m pairs formed by the associated output module (OMj) and the m input modules (IMi), said sequencer (SQ) supplies to each processing unit (PUi), at the start of each step (y), a pair of values formed by an identifier of an input module (IMi) and of its input capacity (CI), each processing unit (PUi) is provided to transmit to the sequencer (SQ), during each step, the revised value of the input capacity (CI), and to determine the sum of the partial accepted quantity values (grij) relating to each pair formed by the associated output module (OMj) and each input module (IMi).

11. Switching system in accordance with claim 7, characterized in that said processing units (PUi) are interconnected according to a ring network allowing data exchanges in a predefined direction between each unit and an adjoining unit situated downstream, and in that each unit is provided:

to transmit during each step to said adjoining unit situated downstream a pair of values formed by an identifier (j(i,y)) of an output module (OMj) and of its revised output capacity (COj(x,y)), to receive during each step from the adjoining unit situated upstream a pair of values formed by an identifier (j(i,y)) of an output module (OMj) and of its output capacity (COj(x,y)), revised during the preceding step.

12. Switching system in accordance with claim 7, characterized in that said processing units (PUi) are interconnected according to a ring network allowing data exchanges in a predefined direction between each unit and an adjoining unit situated downstream, and in that each unit is provided:

to transmit during each step to said adjoining unit situated downstream a pair of values formed by an identifier of an input module (IMi) and of its revised input capacity, to receive during each step from the adjoining unit situated upstream a pair of values formed by an identifier of an input module (IMi) and of its input capacity, revised during the preceding step.

* * * * *